United States Patent
Xu

(10) Patent No.: US 9,953,106 B2
(45) Date of Patent: Apr. 24, 2018

(54) DYNAMIC GENERATION OF TRAVERSAL CODE FOR A GRAPH ANALYTICS ENVIRONMENT

(71) Applicant: GraphSQL, Inc., Mountain View, CA (US)

(72) Inventor: Yu Xu, Millbrae, CA (US)

(73) Assignee: GraphSQL, Inc., Mountain View, CA (US)

( * ) Notice: Subject to any disclaimer, the term of this patent is extended or adjusted under 35 U.S.C. 154(b) by 494 days.

(21) Appl. No.: 14/488,535

(22) Filed: Sep. 17, 2014

(65) Prior Publication Data

US 2015/0081739 A1    Mar. 19, 2015

Related U.S. Application Data

(60) Provisional application No. 61/879,366, filed on Sep. 18, 2013.

(51) Int. Cl.
   *G06F 17/30*     (2006.01)

(52) U.S. Cl.
   CPC .. *G06F 17/30958* (2013.01); *G06F 17/30566* (2013.01)

(58) Field of Classification Search
   CPC ......... G06F 17/30566; G06F 17/30958; G06F 17/30979

USPC .......................................... 707/722, 792, 798
See application file for complete search history.

(56) References Cited

U.S. PATENT DOCUMENTS

| | | | |
|---|---|---|---|
| 7,149,733 B2* | 12/2006 | Lin et al. | |
| 2004/0015487 A1* | 1/2004 | Lin et al. | 707/3 |
| 2008/0216052 A1* | 9/2008 | Hejlsberg et al. | 717/114 |
| 2015/0026158 A1* | 1/2015 | Jin | 707/722 |
| 2015/0081724 A1* | 3/2015 | Xu | 707/749 |

OTHER PUBLICATIONS

S. Choudhury et al., Graph object oriented model and query language: a semi-structured approach, 2001, IEEE, 685-689.*

* cited by examiner

*Primary Examiner* — Jean B Fleurantin

(57) ABSTRACT

Systems, software, and methods are described herein dynamically generate traversal code for a graph analytics environment. In one example, a method of dynamically generating traversal code for a graph analytics environment includes, in one or more processing systems, identifying a query expression for a relational analytics environment. The method further includes generating the traversal code for the graph analytics environment based on the query expression, and executing the traversal code in the graph analytics environment on a graphical database. The method also provides communicating results of the traversal code to the relational analytics environment.

16 Claims, 4 Drawing Sheets

DYNAMIC GENERATION OF TRAVERSAL CODE FOR A GRAPH ANALYTICS ENVIRONMENT

RELATED APPLICATIONS

This application is related to and claims priority to U.S. Provisional Patent Application No. 61/879,366, entitled "SYSTEMS, METHODS, AND SOFTWARE FOR OPERATING A DYNAMIC PATH ENGINE IN A DATABASE AND GRAPH ENVIRONMENT," filed on Sep. 18, 2013, and which is hereby incorporated by reference in its entirety.

TECHNICAL BACKGROUND

Database systems are typically used to store, manage, and retrieve various forms of data, along with relationships between the data. Various forms and types of databases have been employed across computer systems for the management of customer lists, inventory data, transactional information, web page management, among a host of other data. In a first database type, a relational database system is a collection of data items organized as a set of formally described tables of fields from which data can be stored and accessed. In a second database type, graphs may be generated to represent data sets, wherein data objects may be represented as nodes and relationships between the objects represented as interconnecting edges.

Databases can quickly become very large as the amount of data increases as well as the number of relationships between fields increases. Further, manipulation of relational databases can require large amounts of memory and processing power, especially when many fields and data entry relationships are maintained. The searching of these databases has been laborious, time consuming, and inordinately and exhaustively detailed, requiring the individual treatment and assessment of each of a multiplicity of nodes and edges. Further, separate and distinct processing languages may be required to process data in the relational database and graph systems. Thus, it may burdensome for programmers to generate data queries using each of the required languages.

OVERVIEW

Systems, software, and methods are described herein dynamically generate traversal code for a graph analytics environment. In one example, a method of dynamically generating traversal code for a graph analytics environment includes, in one or more processing systems, identifying a query expression for a relational analytics environment. The method further includes generating the traversal code for the graph analytics environment based on the query expression, and executing the traversal code in the graph analytics environment on a graphical database. The method also provides communicating results of the traversal code to the relational analytics environment.

In another instance, a computer apparatus to dynamically generate traversal code includes processing instructions that direct a computing system to identify a query expression for a relational analytics environment. The processing instructions further direct the computing system to generate traversal code for a graph analytics environment based on the query expression, and execute the traversal code in the graph analytics environment on a graphical database. The processing instructions also direct the computing system to communicate results of the traversal code to the relational analytics environment. The computer apparatus further provides one or more non-transitory computer readable media that store the processing instructions.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

Figure 1:
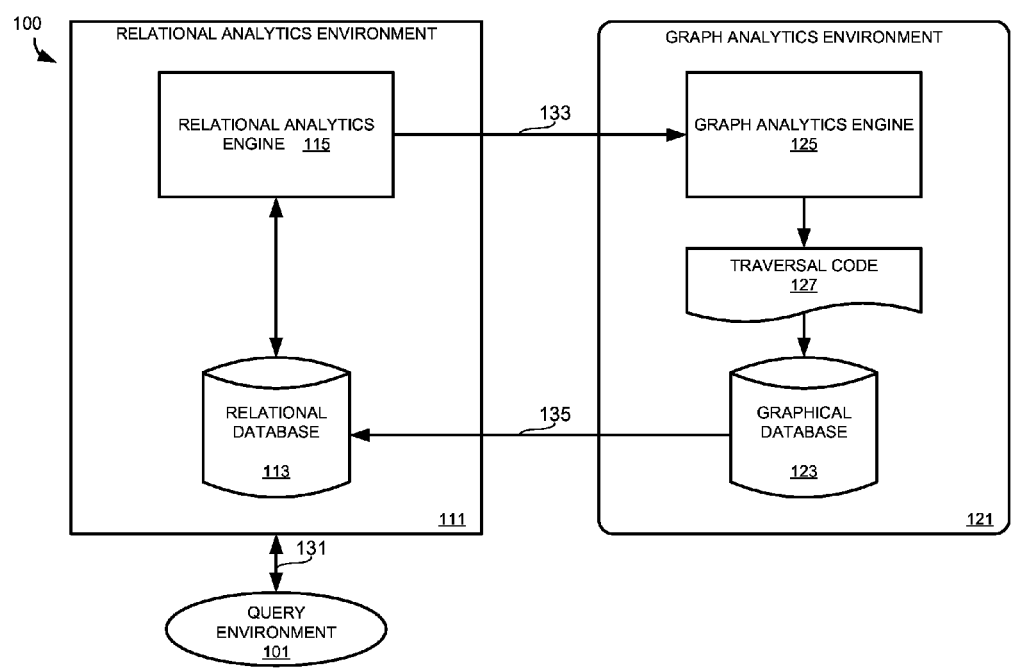
FIG. 1 illustrates a block diagram of a computer system configured to operate a dynamic path engine in a database and graph environment.

Manipulation of relational databases can require large amounts of memory and processing power, especially when many fields and data entry relationships are maintained. Using databases represented in a graph form, various optimizations and improvements can be realized which allow for searching entries in a database. Searching for entries having complex relationships in large databases is time consuming and processor intensive. The systems, software, and methods discussed herein allow for efficient processing of large databases, among other operations.

A graph database is a database that employs graph structures with at least nodes (referred to herein as vertices), edges or connections, and other properties to represent and store data. Every data vertex in a graph database typically contains pointers to adjacent vertices, with a common connection referred to as an edge that relates two vertices to each other.

A relational or other database can be converted into a graph database using graph theory techniques to link vertices via edges. Each vertex of the graph can represent an entry in a database, and vertices can be subdivided into different types based on the data field they are generated from. For example, a first subset of the vertices can represent a first database field type, such as a first column in a relational database table. A second subset of vertices can represent a second database field type, such as a second column in a relational database table. Further subsets of vertices can represent further field types.

In the present example, analytics environments may include both a relational database and a graphical database, where the graphical database is a graphical representation of the relational database. The relational database may be queried by a relational analytics engine in a relational analytics environment which includes the relational analytics engine and the relational database. The graphical database may be queried by a graph analytics engine in a graph analytics environment which includes the graph analytics engine and the graphical database.

As discussed above, the relational database and the graphical database may have very different structures. Thus, the computer languages used for querying the two databases may be very different. For example, the relational analytics engine may use Structured Query Language (SQL) or another similar language to query the relational database, while the graph analytics engine may use C, C++, C#, python, Java code, or other similar language to query the graphical database. This means that commands for querying the relational database may not be directly used to query the graphical database, but instead must be first translated into an appropriate language for use by the graph analytics engine to query the graphical database.

While many users are fluent in the SQL language used to query the relational database, the same users may have difficulty generating queries in the necessary language for the graphical database. For simple queries, the graphical database and the graph analytics environment could be treated as a black box that provides superior processing power for queries of the relational database without the user requiring an understanding of the inner workings of the graphical database and the graph analytics environment.

In practice, many desired operations to be performed on the relational database use very similar commands and a library of operations for use by the graph analytics engine may be constructed in advance, and stored for their likely future use in the graph analytics environment. However, sometimes more complex operations on the graphical database are required. In such a case, if the operation did not already exist in the operation library, the user would be required to write a new operation in the appropriate language used by the graph analytics engine. This required the user to be fluent in multiple languages, in addition to being familiar with the structure of the graphical database.

Figure 2:
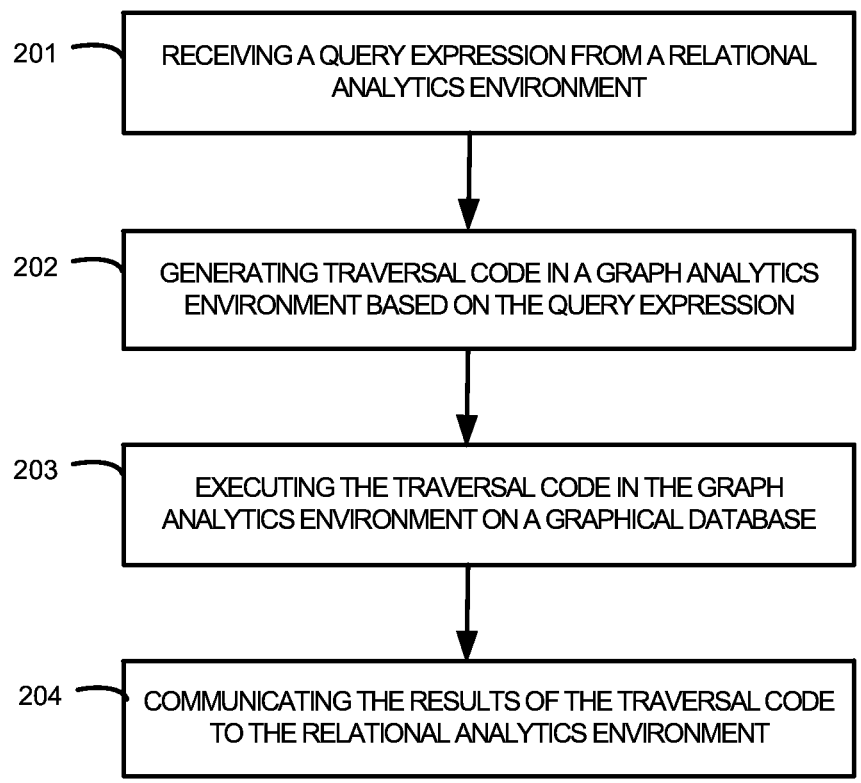
FIG. 2 illustrates a flow chart of a method of dynamically generating traversal code in a database and graph environment.

Referring now to FIG. 1, unified analytics environment 100 and the associated discussion are intended to provide a brief, general description of a suitable computing environment in which the processes illustrated in at least FIG. 2 may be implemented. Many other configurations of computing devices and software computing systems may be employed to implement a system for operating as a dynamic path engine in a database and graph environment, such as that found in FIG. 3.

FIG. 1 illustrates a unified analytics environment 100 according to one example. Unified analytics environment 100 includes query environment 101, relational analytics environment 111, and graph analytics environment 121. Relational analytics environment 111 further includes relational database 113 and relational analytics engine 115. Graph analytics environment 121 further includes graphical database 123 and graph analytics engine 125. Query environment 101 is configured to communicate with relational analytics environment 111 over communication link 131, and relational analytics environment 111 is further configured to communicate with graph analytics environment 121 over communication links 133 and 135.

Query environment 101 comprises one or more computer systems configured to query relational database 113 in relational analytics environment 111. Examples of query environment 101 can include end user devices, computers, servers, cloud systems, or any other like device or system.

Relational analytics environment 111 comprises one or more computer systems configured to analyze, in response to an inquiry from query environment 101, relational database 113 using relational analytics engine 115. Relational analytics environment 111 is further configured to identify query expressions within the inquiry from query environment 101, and communicate these query expressions to graph analytics environment 121. In some examples, relational analytics environment 111 may represent a relational database management system or RDBMS. Relational analytics environment 111 can include servers, computers, cloud systems, or any other similar device or computing system, including combinations thereof.

Graph analytics environment 121 comprises one or more computer systems configured to store graphical database 123, and to analyze graphical database 123 using graph analytics engine 125. Graph analytics environment 121 can be configured to respond to query expressions communicated from relational analytics environment 111 by generating traversal code 127, which then operates upon graphical database 123. Results from these operations on graphical database 123 may then be communicated to relational analytics environment 111 and relational database 113 over communication link 135. Graph analytics environment 121 can include servers, computers, cloud systems, or any other similar device or computing system, including combinations thereof.

Communication links 131, 133, and 135 use metal, glass, air, space, or some other material as the transport media. Communication links 131, 133, and 135 may use various communication protocols, such as Internet Protocol (IP), Ethernet, communication signaling or any other communication format—including combinations thereof.

Although query environment 101, relational analytics environment 111, and graph analytics environment 121 are illustrated as separate environments, unified analytics environment 100 may be implemented in any number of environments, and may be implemented using any number of computing systems.

Figure 3:
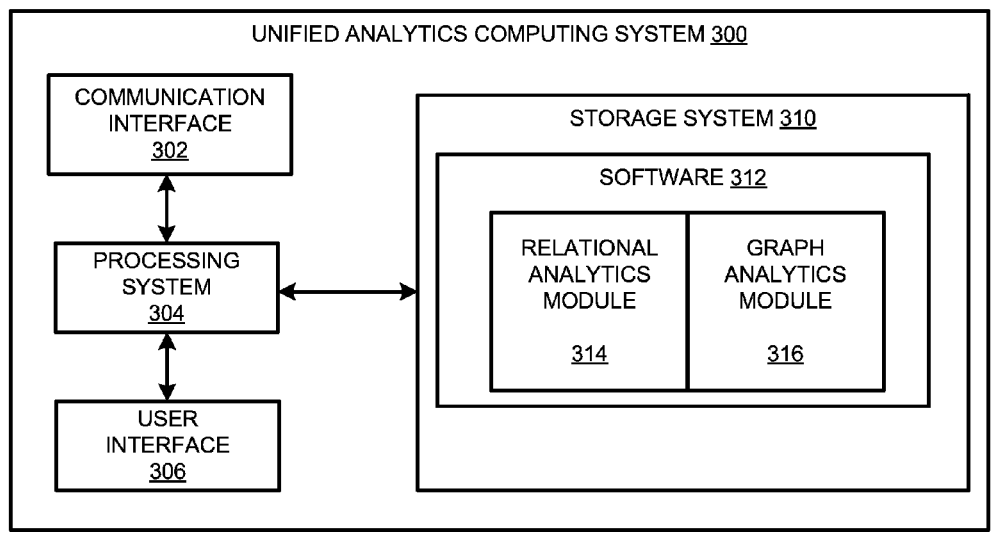
FIG. 3 illustrates a block diagram of a unified analytics computing system configured to generate traversal code in a database and graph environment.

Relational analytics environment 111 and graph analytics environment 121 may be any type of computing system, such as a server computer, client computer, internet appliance, mobile device, or any combination or variation thereof. FIG. 3, discussed in more detail below, provides another detailed illustration of a computing system. Indeed, relational analytics environment 111 and graph analytics environment 121 may be implemented as a single computing system, but may also be implemented in a distributed manner across multiple computing systems. For example, relational analytics environment 111 and graph analytics environment 121 may be representative of a server system (not shown) with which computer systems (not shown) running software may communicate to enable relational analytics environment and graph analytics environment features. Indeed, relational analytics environment 111 and graph analytics environment 121 are provided as examples of general purpose computing systems that, when implementing the method illustrated in FIG. 2, become specialized systems capable of operating as a relational analytics environment or a graph analytics environment.

In one example, SQL code is written by a user in query environment 101 and communicated to a relational analytics environment 111 over communication link 131 where it is executed by relational analytics engine 115 to query relational database 113. When a user requires an operation on graphical database 123, the user may insert a query expression within one or more SQL statements. Relational analytics environment 111 detects the query expression and communicates it to graph analytics environment 121.

The query expression is written in a query language which is considered to be a higher-level language than the C, C++, C#, or Java code used by graph analytics engine 125. Since this query language is designed for a specific task of querying databases, it is much simpler than C or Java and easier for a user to learn.

As an example, a SQL command of GraphSQL(graph_engine/a/a/c/) may be communicated from query environment 101 to relational analytics environment 111. The 'GraphSQL' portion of the command is used to instruct relational analytics engine 115 that a query expression is enclosed within the following parentheses. The 'graph_engine' portion of the command instructs relational analytics engine 115 that the following query expression is to be communicated to graph analytics engine 125. The '/a/a/c/' portion of the command is the actual query expression using query language parameters that is communicated to graph analytics engine 125.

In response to receiving the query expression, graph analytics engine 125 generates traversal code 127 in C, Java, or other languages used to query graph analytics engine 125. Traversal code 127 is then used by graph analytics engine 125 to operate on graphical database 123. Results from this operation on graphical database 123 are then communicated to relational analytics environment 111 or relational database 113 over communication link 135.

Query expressions comprise any combination of characters, numbers, and symbols that communicate the desired operation to graph analytics engine 125. In this example, letters and slash marks are used to communicate to the operation to graph analytics engine 125, however other examples may use different characters, numbers, and symbols. When graph analytics engine 125 receives the query expression from relational analytics environment 111, it then generates traversal code 127 and executes the compiled traversal code 127 on graphical database 123.

As an example of method of operating unified analytics environment 100, FIG. 2 is presented. FIG. 2 illustrates a flow chart of a method to dynamically generate traversal code in a database and graph environment. The process described for FIG. 2 may be performed in response to a query or other request by a user or system including at least one query expression.

In FIG. 2, graph analytics environment 121 receives a query expression from relational analytics environment 111 (201). Prior to this operation, relational analytics environment 111 received a query from query environment 101. This query included a query expression, which may be communicated from relational analytics environment 111 to graph analytics environment 121.

Based on the query expression, graph analytics environment 121 generates traversal code 127 (202). Graph analytics environment 121 executes the compiled traversal code in graph analytics environment 121 on graphical database 123 (203). Graph analytics environment 121 can also compile traversal code 127 prior to execution of traversal code 127.

Graph analytics environment 121 communicates the results of executing traversal code 127 on graphical database 123 to relational analytics environment 111 (204). In some examples, these results may be communicated directly to relational database 113 to update relational database 113 accordingly.

FIG. 3 illustrates a unified analytics computing system 300 according to one example. Unified analytics computing system 300 includes communication interface 302, processing system 304, user interface 306, storage system 310, and software 312. Processing system 304 loads and executes software 312 from storage system 310. Software 312 includes relational analytics module 314 and graph analytics module 316. Software 312 may further include an operating system, utilities, drivers, network interfaces, applications, or some other type of software. When executed by unified analytics computing system 300, software modules 314 and 316 direct processing system 304 to operate as relational analytics environment 111 and graph analytics environment 121 as described herein.

In particular, in at least one example, communication interface 302 is configured to receive a query from query environment 101. In some examples, the query may be in the form of SQL and include query expressions to be processed by unified analytics computing system 300. After the receipt of the query, relational analytics module 314 will process the relational functions and identify query expressions within the relational functions. These query expressions will then be communicated to graph analytics module 316 for processing. Following the completion of the processing, a response will be created using at least the graph function result and will be communicated to query environment 101 using communication interface 302.

Although unified analytics computing system 300 includes two software modules in the present example, it should be understood that any number of modules could provide the same operation.

Additionally, computing system 300 includes communication interface 302 that can be configured to receive queries from any outside query source, and transfer a response back to the query source. Communication interface 302 can communicate using Internet Protocol (IP), Ethernet, communication signaling, or any other communication format.

Referring still to FIG. 3, processing system 304 can comprise a microprocessor and other circuitry that retrieves and executes software 312 from storage system 310. Processing system 304 can be implemented within a single processing device, but can also be distributed across multiple processing devices or sub-systems that cooperate in executing program instructions. Examples of processing system 304 include general-purpose central processing units, application specific processors, and logic devices, as well as any other type of processing device, combinations of processing devices, or variations thereof.

Storage system 310 can comprise any storage media readable by processing system 304, and capable of storing software 312. Storage system 310 can include volatile and nonvolatile, removable and non-removable media implemented in any method or technology for storage of information, such as computer readable instructions, data structures, program modules, or other data. Storage system 310 can be implemented as a single storage device, but may also be implemented across multiple storage devices or subsystems. Storage system 310 can comprise additional elements, such as a controller, capable of communicating with processing system 304.

Examples of storage media include random access memory, read only memory, magnetic disks, optical disks, flash memory, virtual memory, and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In some implementations, the storage media can be a non-transitory storage media. In some implementations, at least a portion of the storage media may be transitory. It should be understood that in no case is the storage media a propagated signal.

User interface 306 can include a mouse, a keyboard, a camera, a voice input device, a touch input device for receiving a gesture from a user, a motion input device for detecting non-touch gestures and other motions by a user, and other comparable input devices and associated processing elements capable of receiving user input from a user. Output devices such as a graphical display, speakers, printer, haptic devices, and other types of output devices may also be included in user interface 306. The aforementioned user input and output devices are well known in the art and need not be discussed at length here. In some examples, user interface 306 can be omitted.

It should be understood that although unified analytics computing system 300 is illustrated as a single system for simplicity, the system may comprise one or more systems or devices. For example, in some embodiments relational analytics module 314 and graph analytics module 316 may be divided into separate systems. In another example, unified analytics computing system 300 may further include a query module, which may create queries to be answered by relational analytics module 314 and graph analytics module 316.

Figure 4:
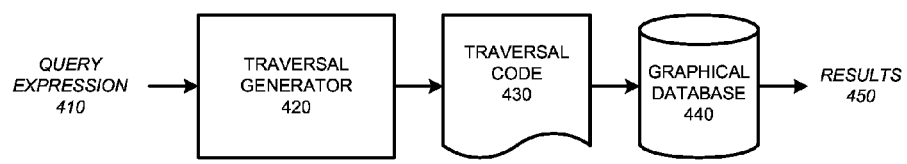
FIG. 4 illustrates an overview of generating traversal code in a unified analytics environment.

Turning to FIG. 4, FIG. 4 illustrates an overview of generating traversal code in a unified analytics environment. FIG. 4 includes query expression 410, traversal generator 420, traversal code 430, graphical database 440, and results 450. As illustrated in the present example, query expression 410 is transferred to traversal code generator 420. Query expression 410 may comprise any language capable of being processed within a relational analytics environment including SQL or some other relational database language. Traversal code generator 420 may represent graph analytics engine 125 from FIG. 1 or any other analytics engine capable of translating the query expression into traversal code. Once the expression is received, traversal code generator 420 generates traversal code 430, which may comprise C, C#, C++, Java, or any other similar programming language. In response to generating traversal code 430, the traversal code is then executed on graphical database 440 to generate results 450. These results may then be transferred to the relational analytics environment to assist in the overarching query of the database, provide a response to an end user, or provide some assistance to the relational analytics environment and the databases stored therein.

In some examples, traversal generator 420 is used to provide a translation mechanism for users familiar with the relational analytics environment. Thus, when the user initiates a query using SQL or other similar query language associated with a relational analytics environment, traversal generator 420 may identify calls to the graph analytics environment, translate the calls into the appropriate traversal language, and apply the traversal code to graphical database 440. For example, a user or some other process may generate a command GraphSQL(graph_engine_information). Upon identifying this call, the command may be transferred from a relational analytics environment to the graph analytics environment. Once in the graph analytics environment, traversal generator 420 may generate the proper traversal code using the graph_engine_information provided within the brackets. Accordingly, rather than separating out the queries to be made to the graphical database, a user may use specially designed SQL functions to call the graph analytics engine to provide results for the query.

Figure 5:
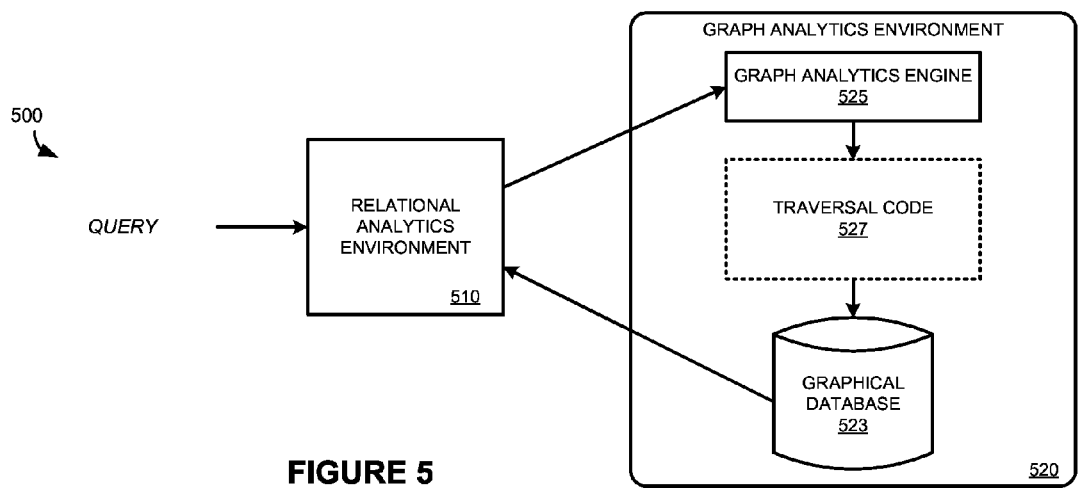
FIG. 5 illustrates an overview of generating traversal code in a unified analytics environment.

As a further demonstration of a query path through a unified analytics environment, FIG. 5 is provided. FIG. 5 illustrates an overview 500 of generating traversal code in a unified analytics environment. Overview 500 includes relational analytics environment 510 and graph analytics environment 520. Graph analytics environment 520 further includes graph analytics engine 525, traversal code 527, and graphical database 523. Relational analytics environment 510 and graph analytics environment 520 may comprise one or more computing systems capable of processing queries to the various databases.

In operation, a user or some other process may generate a query that is received by relational analytics environment 510. Relational analytics environment 510 may include an analytics engine as well as a database that stores data objects and relationships between the data objects. Once the query is received from the user, using SQL or other similar relational query language, the analytics engine within relational analytics environment 510 may identify one or more query expressions that require the use of graph analytics environment 520.

In response to identifying a query expression intended for graph analytics environment 520, the expression is transferred to graph analytics engine 525. Graph analytics engine 525 generates traversal code 527 based on the query expression and executes traversal code 527 on graphical database 523. Once the code is applied to the graphical database, the results are then transferred back to relational analytics environment 510. These results may then be used in presenting the user with an answer to the query or possibly updated the relational database within relational analytics environment 510.

In some examples, a user of the unified analytics environment may be familiar with SQL or another similar programming language, but may be unfamiliar with the language necessary to traverse graphs within graphical database 523. Accordingly, one or more commands within the familiar language may be used to trigger a translation into the necessary code for a graph traversal. For instance, a user may generate a command GraphSQL(graph_engine_information). Upon identifying this query expression, the expression may be transferred from a relational analytics environment to the graph analytics environment. Once in the graph analytics environment, graph analytics engine 525 may generate the proper traversal code using the graph_engine_information provided within the brackets. Accordingly, rather than separating out the queries to be made to the graphical database, a user may use specific SQL functions to call the graph analytics engine to provide results for the query.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A computer-implemented method of dynamically generating traversal code for a graph analytics environment, the method comprising:
   in one or more processing systems, identifying a query expression from a relational analytics environment, wherein the query expression is written in a first language for a relational database;

generating the traversal code for the graph analytics environment based on the query expression, wherein the traversal code is written in a second language;

executing the traversal code in the graph analytics environment on a graphical database; and communicating results of the traversal code to the relational analytics environment, wherein communicating the results of the traversal code to the relational analytics environment comprises communicating the results of the traversal code to the relational analytics environment to update a relational database in the relational analytics environment.

2. The method of claim 1 wherein the query expression for the relational analytics environment comprises a Structured Query Language (SQL) expression for the relational analytics environment.

3. The method of claim 2 wherein the relational analytics environment comprises a relational database management system (RDBMS).

4. The method of claim 3 wherein the graphical database comprises one or more graph structures generated via the RDBMS.

5. The method of claim 4 wherein the one or more graph structures each comprises one or more nodes and edges.

6. The method of claim 4 wherein executing the traversal code in the graph analytics environment on the graphical database comprises executing the traversal code in the graph analytics environment to traverse the one or more graph structures.

7. The method of claim 1 wherein the traversal code comprises one of C, C++, Python, C#, or Java.

8. The method of claim 1 wherein identifying the query expression for the relational analytics environment comprises receiving, in the graph analytics environment, the query expression from the relational analytics environment.

9. A computer apparatus to dynamically generate traversal code, the computer apparatus comprising:

processing instructions that direct a computing system, when executed by the computing system, to: identify a query expression from a relational analytics environment, wherein the query expression is written in a first language for a relational database;

generate traversal code for a graph analytics environment based on the query expression, wherein the traversal code is written in a second language;

execute the traversal code in the graph analytics environment on a graphical database; and communicate results of the traversal code to the relational analytics environment, wherein communicating the results of the traversal code to the relational analytics environment comprises communicating the results of the traversal code to the relational analytics environment to update a relational database in the relational analytics environment; and one or more non-transitory computer readable storage media that store the processing instructions.

10. The computer apparatus of claim 9 wherein the query expression for the relational analytics environment comprises a Structured Query Language (SQL) expression for the relational analytics environment.

11. The computer apparatus of claim 10 wherein the relational analytics environment comprises a relational database management system (RDBMS).

12. The computer apparatus of claim 11 wherein the graphical database comprises one or more graph structures generated via the RDBMS.

13. The computer apparatus of claim 12 wherein the one or more graph structures each comprise one or more nodes or edges.

14. The computer apparatus of claim 12 wherein the processing instructions to execute the traversal code in the graph analytics environment on the graphical database direct the computing system to execute the traversal code in the graph analytics environment to traverse the one or more graph structures.

15. The computer apparatus of claim 9 wherein the traversal code comprises one of C, C++, Python, C#, or Java.

16. The computer apparatus of claim 9 wherein the processing instructions to identify the query expression from a relational analytics environment direct the computing system to receive, in the graph analytics environment, the query expression from the relational analytics environment.

* * * * *